(12) United States Patent
McGee et al.

(10) Patent No.: US 8,246,168 B2
(45) Date of Patent: Aug. 21, 2012

(54) METHACRYLATE-BASED BULKY SIDE-CHAIN SILOXANE CROSS LINKERS FOR OPTICAL MEDICAL DEVICES

(75) Inventors: Joseph A. McGee, Rochester, NY (US); Jay F. Kunzler, Canandaigua, NY (US); Richard M. Ozark, Solvay, NY (US); Joseph C. Salamone, San Antonio, TX (US)

(73) Assignee: Bausch & Lomb Incorporated, Rochester, NY (US)

( * ) Notice: Subject to any disclaimer, the term of this patent is extended or adjusted under 35 U.S.C. 154(b) by 756 days.

(21) Appl. No.: 12/267,633

(22) Filed: Nov. 10, 2008

(65) Prior Publication Data

US 2010/0118261 A1    May 13, 2010

(51) Int. Cl.
  *G02C 7/04*      (2006.01)
  *C08G 77/04*     (2006.01)
  *B42D 15/00*     (2006.01)
  *C08L 83/06*     (2006.01)

(52) U.S. Cl. ............. 351/160 R; 351/247; 525/7.2; 525/12; 525/88; 525/92 G; 525/100; 525/193; 525/199; 528/10; 524/588; 523/107

(58) Field of Classification Search ............. 351/160 R, 351/247; 525/7.2, 12, 88, 92 G, 100, 193, 525/199; 528/10; 524/64.1; 523/107
See application file for complete search history.

(56) References Cited

U.S. PATENT DOCUMENTS 5,346,976 A    9/1994  Ellis et al.
6,783,897 B2 * 8/2004 Kang et al. ............. 429/313

* cited by examiner

*Primary Examiner* — Duc Truong
(74) *Attorney, Agent, or Firm* — Glenn D. Smith

(57) ABSTRACT

Novel polymers for biomedical use, especially rigid gas permeable contact lenses that are based on bulky side-chain siloxane cross linkers. The siloxanes, either alone, or as copolymers with bulky and non-bulky mono-functional polymerizable siloxanes, fluoro monomers, such as hexafluoroisopropyl methacrylate, and hydrophilic monomers, result in transparent, high oxygen permeable polymers possessing excellent lathing and milling characteristics.

2 Claims, No Drawings

METHACRYLATE-BASED BULKY SIDE-CHAIN SILOXANE CROSS LINKERS FOR OPTICAL MEDICAL DEVICES

FIELD OF THE INVENTION

This invention relates to copolymers useful as optical medical devices. More specifically, this invention describes novel polymers for biomedical use, especially rigid gas permeable (RGP) contact lenses that are based on bulky side-chain methacrylate polysiloxane cross linkers. The bulky side-chain methacrylate siloxane cross linkers, either alone, or as copolymers with bulky and non-bulky mono-functional polymerizable siloxanes, fluoro monomers, such as hexafluoroisopropyl methacrylate, and hydrophilic monomers, result in transparent, high oxygen permeable polymers possessing excellent lathing and milling characteristics.

BACKGROUND OF THE INVENTION

Contact lenses may be classified in two general categories, soft and hard lenses. Soft contact lenses are made of a material with a relatively low modulus, such that the lenses are flexible and bendable. Soft hydrogel contact lenses are an example. Hard contact lenses have a much higher modulus and are relatively stiff. One class of hard contact lens materials is RGP copolymers. RGP materials are composed of a silicon-containing copolymer and are able to transmit gases, particularly oxygen. Thus, oxygen can be transmitted through an RGP contact lens and to the cornea while the lens is worn.

U.S. Pat. No. 5,346,976 (Ellis et al.) describes various RGP copolymers. The preferred copolymers of U.S. Pat. No. 5,346,976 have been successful commercially. However, the oxygen permeability of these preferred copolymers is generally no greater than 140 barrers.

Oxygen permeability is a desirable property for contact lens materials since the human cornea will be damaged if it is deprived of oxygen for an extended period. Oxygen permeability is conventionally expressed in units of barrer, also called Dk. Oxygen transmissibility is a property of contact lens materials related to oxygen permeability. Oxygen transmissibility is oxygen permeability divided by lens thickness, or Dk/t. Oxygen permeability of rigid contact lens materials is important. As an example, orthokeratology has gained in popularity in recent years. Orthokeratology involves wearing a rigid contact lens overnight, with the lens being designed to intentionally alter the shape the cornea. As another example, some lens designs, such as toric lenses or multifocal lenses, may be relatively thick, meaning less oxygen is transmitted through the lens. Thus, unless the lens has a sufficiently high oxygen permeability, the lens may not be safe for overnight wear.

Currently, most RGP contact lenses are manufactured by cutting the lens on a lathe. As an example, the RGP copolymer is cast in the form of a rod, the rod is cut into cylindrical disks (also referred to as buttons), and lenses are lathed from these buttons. Thus, an RGP material must have sufficient toughness, and not be brittle, so that it is machineable.

A challenge in developing improved RGP copolymers is that modifying a copolymer to increase oxygen permeability frequently compromises other desired properties of the material, such as machineability or optical clarity. Also, increasing the silicone content to increase oxygen permeability may result in a surface that is not sufficiently wettable by the tear film when worn.

SUMMARY OF THE INVENTION

This invention provides copolymers useful as an optical medical device forming material, and contact lenses formed therefrom. The copolymers are the polymerization product of a monomeric mixture comprising bulky side-chain siloxane cross linkers. For example, a neohexyl or a trifluoropropyl side-chain. The synthesis of the bulky side-chain siloxane cross linkers can be performed by either a direct ring opening polymerization route or a secondary hydrosilyation route. The direct ring-opening route consists of acid catalyzed ring opening of a cyclic siloxane that contains the bulky functionality together with an end-capping agent. The monomer mixture may further include one or more of the following comonomers: a hydrophilic monomer; a fluorinated monomer; an ethylenically unsaturated monofunctional silicon-containing monomer; hardness modifying nonfluorinated (meth)acrylate monomer; a supplemental crosslinking agent; a polymerization initiator; an ultraviolet blocking agent; or a colorant.

The copolymers of this invention provide in one embodiment RGP contact lens materials that have relatively high oxygen permeability, yet still are optically clear and machineable.

DETAILED DESCRIPTION OF PREFERRED EMBODIMENTS

This invention provides a copolymer useful as a rigid gas permeable contact lens material that is the polymerization product of a monomeric mixture comprising bulky side-chain siloxane cross linkers.

The term "bulky side-chain siloxane cross linkers" denotes that the prepolymer is polymerizable and contains space filling side-chains such as neohexyl and a hexafluoroisopropyl side chain. The methacrylate bulky side chain siloxane cross linkers, either alone, or as copolymers with bulky and non-bulky mono-functional polymerizable siloxanes, fluoro monomers, such as hexafluoroisopropyl methacrylate, and hydrophilic monomers, result in transparent, high oxygen permeable polymers possessing excellent lathing and milling characteristics.

Bulky side chain siloxane cross linkers according to the invention herein would include those having the following structural formula:

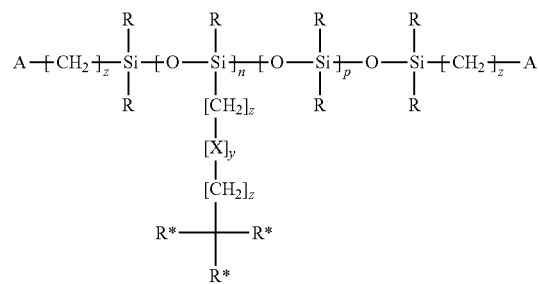

wherein z is 2-10, n, p and z are integers, X is oxygen, sulfur or —NH—, y is 0 or 1, R* is independently alkyl, arylalkyl, cycloalkyl, heterocyclo or fluoroalkyl, trialkyl or triaryl-silyl, or trialkoxyl or triaryloxysilane radical, A is activated unsaturation such as acrylate, methacrylate, acrylamido, styryl, maleimideo, vinyl, vinyl ether, vinyl carbonate, itacanoyl and the like, and R is independently alkyl, arylalkyl cycloalkyl, heterocyclo or fluoroalkyl radical.

The synthesis of the bulky side-chain siloxane cross linkers can be performed by either a direct ring-opening polymerization route or a secondary hydrosilyation route. The direct ring-opening route consists of acid catalyzed ring-opening of a cyclic siloxane that contains the bulky functionality together with an end-capping agent. Scheme I shows a synthetic scheme of the neohexyl side-chain via this

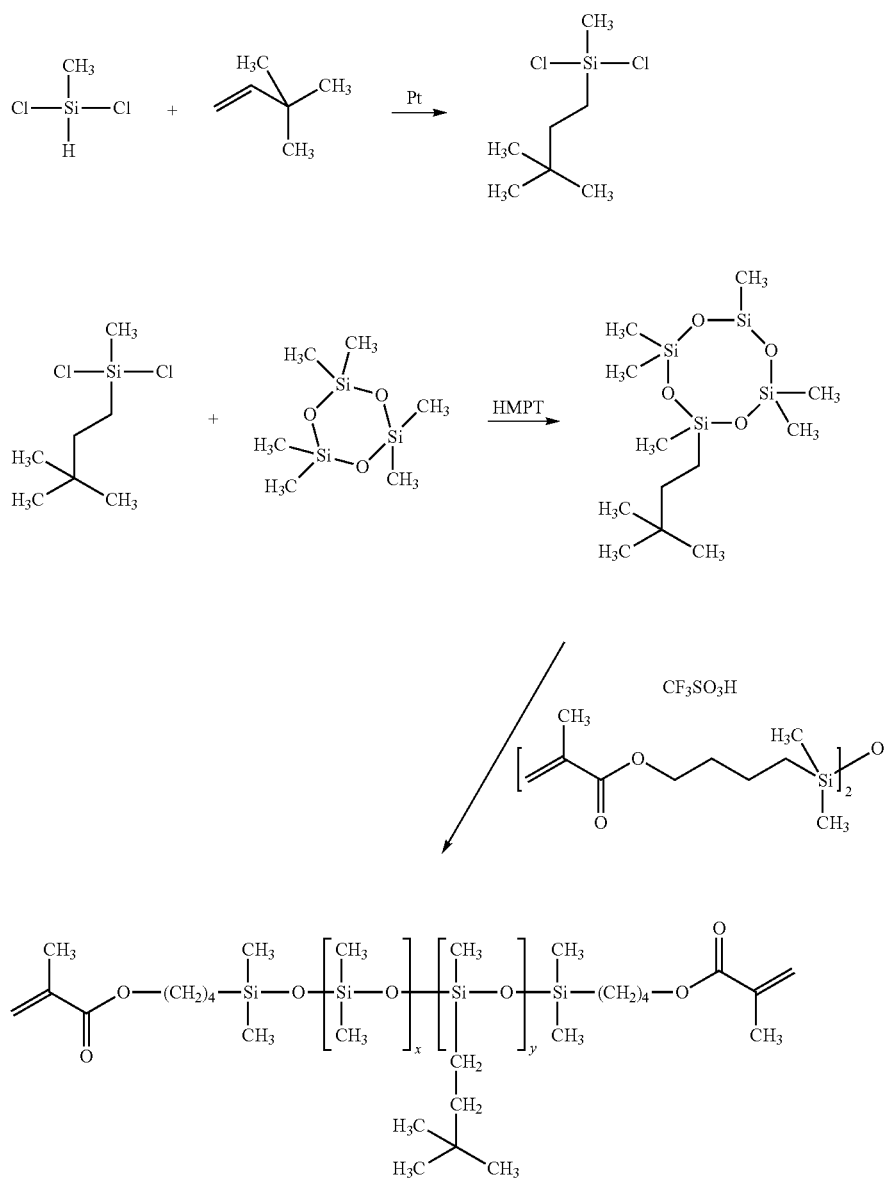

route.

Another synthetic method for obtaining the bulky side-chain siloxane cross linkers can be a secondary hydrosilyation route consisting of a two-phase reaction scheme. The first phase is a co-ring-opening polymerization of a hydride functionalized cyclic siloxane with a methacrylate-capped disi- loxane. The second phase consists of a platinum catalyzed hydrosilyation of an allylic or vinyl functionalized bulky group with the hydride containing siloxane. Scheme II (below) shows the synthesis of a 3-(trifluoropropoxy)propyl side-chain via the secondary hydrosilyation route.

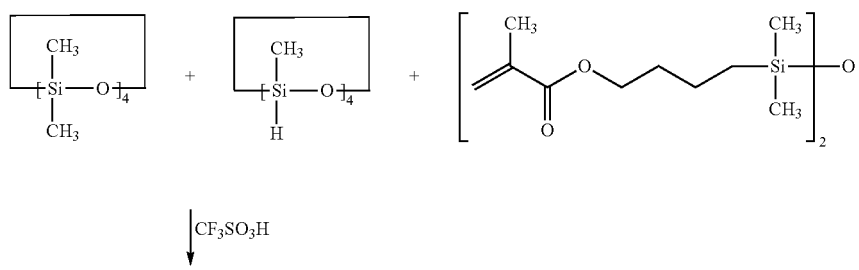

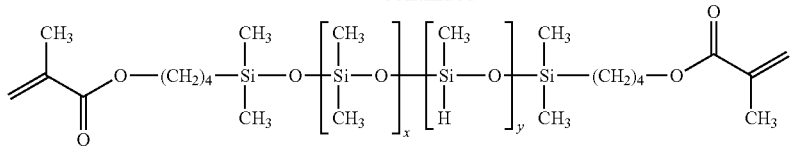

y = 25, 50, 75 mole %; x + y = 25, 50, 100

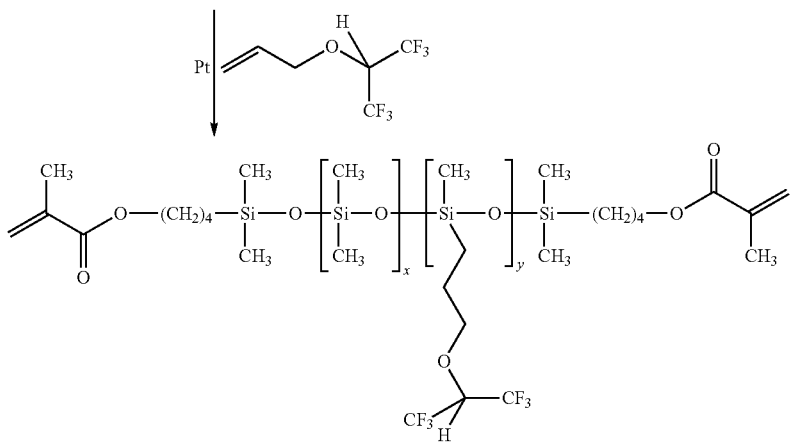

Preferably, the prepolymer has a molecular weight (Mn) of less than 22,000, more preferably 4,000 to 8,000, and most preferably 1,500 to 2,500.

The copolymers of this invention are formed by copolymerizing the bulky side-chain siloxane cross linkers with one or more comonomers. Since the cross linkers are end-capped with polymerizable ethylenically unsaturated radicals, they are polymerizable by free radical polymerization. The monomeric mixtures employed in the invention include conventional lens-forming or device-forming monomers. (As used herein, the term "monomer" or "monomeric" and like terms denote relatively low molecular weight compounds that are polymerizable by free radical polymerization, as well as higher molecular weight compounds also referred to as "prepolymers", "macromonomers", and related terms.) For copolymers, the subject cross linkers are included in the monomer mixture at 5 to 95 weight percent, preferably 10 to 70 weight percent, most preferably 10 to 50 weight percent.

A first class of suitable comonomers includes hydrophilic monomers. Hydrophilic monomers are useful for increasing hydrophilicity and improving wettability of the resultant copolymer. Conventional hydrophilic monomers include: hydrophilic (meth)acrylates, such as 2-hydroxyethyl methacrylate; hydrophilic (meth)acrylamides, such as methacrylamide and N,N-dimethylacrylamide; (meth)acrylic carboxylic acids, such as methacrylic acid; and vinyl lactams, such as N-vinylpyrrolidone. The hydrophilic monomer may be included in the monomeric mixture at about 1 to about 25 weight percent, more preferably at about 2 to about 20 weight percent.

A second class of suitable comonomers includes ethylenically unsaturated, monofunctional organosiloxane monomers, i.e., monomers including only one ethylenically unsaturated radical and exclusive of the polysiloxane-containing prepolymer. These monomers are useful for increasing oxygen permeability of the copolymer. One suitable class of organosiloxane monomers include known bulky, monofunctional polysiloxanylalkyl monomers represented by Formula (IX):

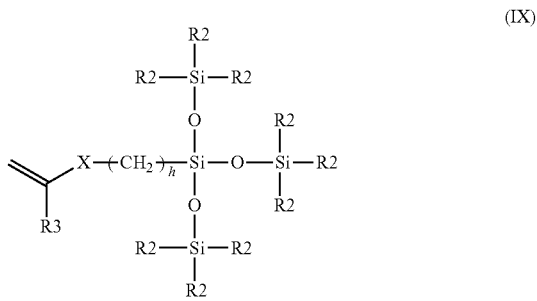

wherein X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl or halogenated alkyl radical, a phenyl radical or a radical of the formula —Si(R$^5$)$_3$ wherein each R$^5$ is independently a lower alkyl radical or a phenyl radical. Such bulky monomers specifically include methacryloxypropyl tris(trimethylsiloxy)silane (TRIS), pentamethyldisiloxanyl methylmethacrylate, tris(trimethylsiloxy) methacryloxy propylsilane, phenyltetramethyldisiloxanylethyl acrylate and methacrylate, tris (trimethylsiloxypropyl) vinyl carbamate, tris (trimethylsiloxypropyl) vinyl carbonate.

The monofunctional organosiloxane monomer may be included in the monomeric mixture at about 5 to about 60 weight percent, more preferably at about 20 to about 50 weight percent.

A third class of suitable comonomers includes fluorinated monomers. A first example is fluorinated itaconates of formula (X):

$$CH_2\!=\!C(COOX)\!-\!CH_2\!-\!COOY \qquad (X)$$

wherein X and Y, which may be the same or different, are independently: hydrogen; $C_1$-$C_{18}$ alkyl or fluoro-substituted alkyl groups; $C_5$-$C_{18}$ cycloalkyl or fluoro-substituted cycloalkyl groups; $C_2$-$C_6$ alkenyl groups or fluoro-substituted alkenyl groups; phenyl groups or fluoro-substituted phenyl groups; benzyl or fluoro-substituted benzyl groups; phenethyl or fluoro-substituted phenethyl groups; or $C_2$-$C_{18}$ ether or fluoro-substituted ether groups; provided that at least one of X and Y is one of the aforementioned fluoro-substituted radicals. Representative itaconates include bis(1,1,3,3,3-hexafluoro-2-propyl) itaconate, bis(2,2,2-trifluoroethyl) itaconate, bis(1H,1H-perfluorooctyl) itaconate, bis(1H,1H,1H-perfluoroudecyl) itaconate, bis(perfluoro-t-butyl) itaconate, bis(pentafluorophenyl) itaconate, and bis(pentafluorophenylmethyl) itaconate.

A second example of a fluorinated monomer is fluorinated (meth)acrylates of formula (XI):

$$CH_2=C(R^{20})-COO-R^{21} \quad (XI)$$

where $R^{20}$ is hydrogen or methyl, and $R^{21}$ is $C_1$-$C_{18}$ fluoro-substituted alkyl groups; $C_5$-$C_{18}$ fluoro-substituted cycloalkyl groups; $C_2$-$C_6$ fluoro-substituted alkenyl groups; fluoro-substituted phenyl groups; fluoro-substituted benzyl groups; fluoro-substituted phenethyl groups; or $C_2$-$C_{18}$ fluoro-substituted ether groups. Such monomers are useful for modifying the hardness of the resultant copolymer. Representative compounds include 1,1,1,3,3,3-hexafluoro-2-propyl methacrylate, pentafluorophenyl methacrylate, perfluoroethyl methacrylate, and 2,2,2-trifluoroethyl methacrylate.

The fluorinated monomer is preferably employed at 5 to 60% by weight of the monomeric mixture from which the copolymer is prepared in order to provide copolymers having sufficient rigidity and hardness. According to preferred embodiments, the itaconate is present at 10 to 50 weight percent in the monomeric mixture.

A fourth class of suitable comonomers includes nonfluorinated aliphatic (meth)acrylates. Such monomers are useful for modifying the hardness of the resultant copolymer, and are preferably an ester of a C1-C20 monohydric or polyhydric alkanol or phenol and (meth)acrylic acid. Representative monomers include: alkyl (meth)acrylates, such as methyl methacrylate, ethyl methacrylate, and neopentyl methacrylate; cycloalkyl-containing (meth)acrylates, such as cyclohexyl methacrylate; and phenyl methacrylate. When this (meth)acrylate is included in the monomeric mixture, it is preferably present at 0.5 to about 50 weight percent, more preferably at about 2 to about 20 weight percent.

The monomer mixture includes a crosslinking monomer (a crosslinking monomer being defined as a monomer having multiple polymerizable functionalities). Since the subject polysiloxane-containing prepolymers are end-capped with at least two polymerizable radicals, these prepolymers will function as a crosslinker. Optionally, a supplemental crosslinking monomer may be added to the initial monomeric mixture. Representative crosslinking monomers include: divinylbenzene, allyl methacrylate, ethyleneglycol dimethacrylate, neopentylglycol dimethacrylate, tetraethyleneglycol dimethacrylate, poly(ethyleneglycol)dimethacrylate, vinyl carbonate derivatives of the diols and polyols, and methacryloxyethyl vinyl carbonate. When a supplemental crosslinking agent is employed, this monomeric material may be included in the monomer mixture at 0.1 to 20 weight percent, more preferably at 0.2 to 10 weight percent.

Other optional components of the monomeric mixture include conventional free radical initiators, which are generally employed at 0.01 to 2% by weight, coloring agents (colorants) and/or ultraviolet blocking compounds.

According to preferred embodiments, the copolymers are the polymerization product of a monomer mixture comprising: the bulky side-chain siloxane cross linker; a hydrophilic monomer; a fluorinated monomer; an ethylenically unsaturated monofunctional silicon-containing monomer; a hardness modifying (meth)acrylate monomer; and at least one member selected from the group consisting of a polymerization initiator, an ultraviolet blocking agent, and a colorant.

The monomeric mixtures can be polymerized by methods known in the art, preferably in the presence of heat or ultraviolet radiation, and if desired, the copolymers can be treated with gamma radiation to reduce any unreacted monomers. Preferably, the mixtures are molded in a shape which is subsequently machined into the form of a contact lens, such as rod stock, a lens button, or a lens blank containing one finished surface. Alternately, the mixtures can be molded directly in the form of a contact lens.

In the case where the copolymers are formed into the shape of a cylindrical disk (button), this disk may be packaged with printed instructions for lathing a rigid gas permeable contact lens from the disk.

Most RGP contact lenses today are manufactured by lathing at least one surface from a blank of the copolymer, and in many cases, by lathing both the front and back surfaces as well as the diameter from a cylindrical button. Therefore, it is important that the copolymer is not only optically clear, but also machineable. Accordingly, the copolymers should have: a toughness of at least 1.2 Mpa·mm, more preferably at least 1.5 Mpa·mm; a Rockwell hardness of at least 90; a Shore D hardness of at least 70; and/or a modulus of at least 800 Mpa.

Toughness may be measured according to ASTM D 790M-86 on 0.5 mm disk samples. Modulus may be measured according to ASTM D-1708a, employing an Instron (Model 4502) instrument; an appropriate size of the sample is gauge length 22 mm and width 4.75 mm, where the sample further has ends forming a dogbone shape to accommodate gripping of the sample with clamps of the Instron instrument, and a thickness of 200+50 microns.

Rockwell hardness may be measured according to ASTM D785, employing a Rockwell hardness instrument, such as Rockwell Hardness Tester Model 3TTB (Wilson Instrument), on disk samples having a smooth, flat surface. Shore D hardness may be measured according to ASTM D2240, employing a Shore D durometer on disk samples. Preferably, for both hardness methods, the samples are preconditioned by storing the samples for at least 40 hours in a chamber with 50% controlled humidity, such as by the method of ASTM E104-85.

Additionally, the copolymers preferably have an oxygen permeability of at least 50 barrers, 80 barrers or 100 barrers, or more preferably at least 120 barrers, and most preferably at least 140 barrers, when measured by the method discussed in the Examples infra. Achieving such high Dk values while maintaining other desirable properties for RGP contact lens materials represents a considerable advancement in the art. And as seen in the following Example, copolymers having Dk of at least 160 barrers are achieved by this invention.

The following examples illustrate various preferred embodiments of this invention.

EXPERIMENTAL

Materials

Hexafluoro-2-propanol (HFIPA), 3,3-dimethylbutene (NHEX), and allyl bromide (AB) were purchased from Aldrich Chemical Co. The HFIPA and NHEX were used as received. The AB was distilled under nitrogen prior to use. Octamethylcyclotetrasiloxane ($D_4$), tetramethylcyclotetrasiloxane ($D_4H$), and platinum-divinyltetramethyl disiloxane complex (2% platinum in xylenes), were purchased from Gelest and used as received. The $D_4H$ was distilled prior to use under dry nitrogen.

Example 1

Synthesis of 1,3-bis(4-methacryloyloxybutyl)tetramethyldisiloxane ($M_2$)(Scheme 1)

To a 5 liter four neck resin flask equipped with a mechanical stirrer, Dean-Stark trap, heating mantle, water cooled condenser and thermometer was added 1,1-dimethyl-1-sila-2-oxacyclohexane (521 g, 4.0 mole), methacrylic acid (361 g, 4.2 mole), and concentrated sulfuric acid (25.5 g, mole). To the reaction mixture was then added 1 L of cyclohexane and hydroquinone (0.95 g, 8.6 mmole) as a polymerization inhibitor. The reaction mixture was heated to reflux for five hours during which time 28 mL of water was collected. The reaction mixture was then cooled, divided, and passed through two chromatography columns filled with 1 kg of alumina (packed using cyclohexane as eluant). The inhibitor butylated hydroxyl toluene (BHT) was added at 500 ppm, cyclohexane was removed using a rotary evaporator and the resultant $M_2$ was placed under vacuum (0.2 mm Hg) for one hour at 80° C. (yield 80%, purity by GC 96%).

$^1$H-NMR (CDCl$_3$, TMS, ∂, ppm): 0.1 (s, 12H, Si—CH$_3$), 0.5 (t, 4H, Si—CH$_2$—), 1.5-1.8 (m, 8H, Si—CH$_2$—CH$_2$—CH$_2$ and Si—CH$_2$—CH$_2$—CH$_2$), 1.95 (s, 6H,=C—CH$_3$), 4.1 (t, 4H, —CH$_2$—O—C(O)), 5.6 (s, 2H, =C—H), 6.2 (s, 2H, =C—H).

Synthetic Scheme 1:

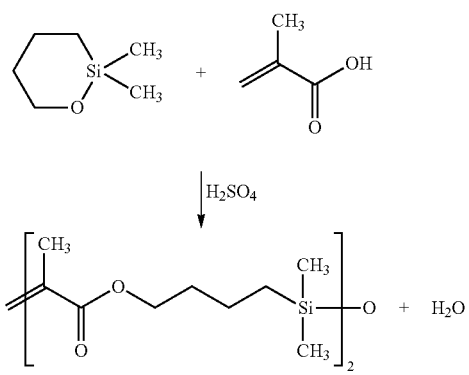

Example 2

Synthesis of methacrylate end-capped poly(25 mole % methyl-siloxane)-co-(75 mole % dimethylsiloxane)($M_2D_{75}D_{25}H$)(Scheme 2)

To a 1000 mL round bottom flask under dry nitrogen was added $D_4$ (371.9 g, 1.25 mole), $D_4H$ (100.4 g, 0.42 mole) and $M_2$ (27.7 g, 0.7 mole). Trifluoromethanesulfonic acid TRIFLIC (0.25%, 1.25 g, 8.3 mmole) was added as initiator. The reaction mixture was stirred 24 hours with vigorous stirring at room temperature. Sodium bicarbonate (10 g, 0.119 moles) was then added and the reaction mixture was again stirred for 24 hours. The resultant solution was filtered through a 5μ Teflon® filter. The filtered solution was vacuum stripped (>0.1 mm Hg) at 80° C. to remove the unreacted silicone cyclics. The resulting silicone hydride functionalized siloxane was a viscous, clear fluid; Yield 70%; SEC: Mn=7,500, Mw/Mn (Pd)=2.2; $^1$H-NMR (CDCl$_3$, TMS, ∂, ppm): 0.1 (s, 525H, Si—CH$_3$), 0.5 (t, 4H, Si—CH$_2$—), 1.5-1.8 (m, 8H, Si—CH$_2$—CH$_2$CH$_2$ and Si—CH$_2$—CH$_2$—CH$_2$), 1.95 (s, 6H, =C—CH$_3$), 4.1 (t, 4H, —CH$_2$—O—C(O)), 4.5 (s, 25H, Si—H), 5.6 (s, 2H, =C—H), 6.2 (s, 2H, =C—H).

Synthetic Scheme 2:

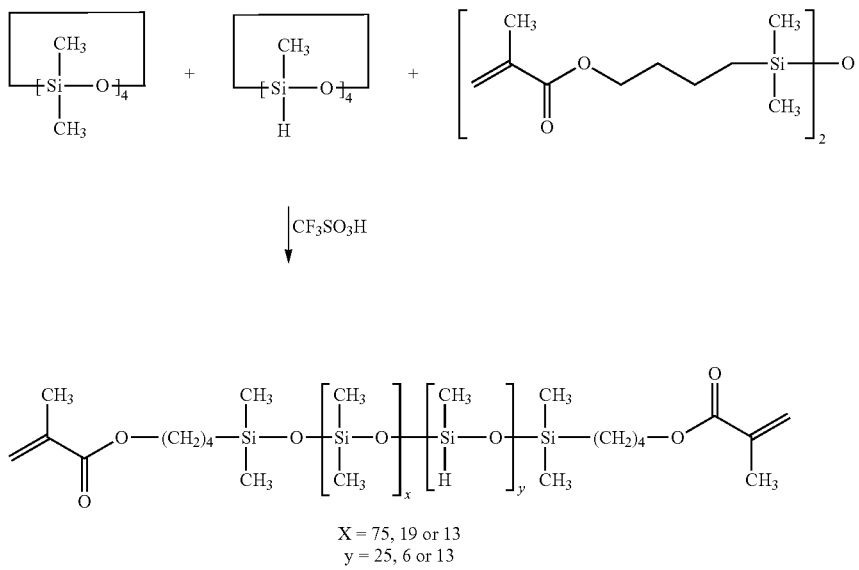

X = 75, 19 or 13
y = 25, 6 or 13

Examples 3-4

Synthesis of methacrylate end-capped poly(6 mole % methyl-siloxane)-co-(19 mole % dimethylsiloxane)($M2D_{19}D_6H$) and methacrylate end-capped poly(13 mole % methyl-siloxane)-co-(13 mole % dimethylsiloxane)($M_2D_{13}D_{13}H$) (Scheme 2)

As described for the synthesis of $M_2D_{75}D_{25}H$ in Example 3, $M_2D_{19}D_6H$ and $M_2D_{13}D_{13}H$ were prepared according to the table given below;

| Polymer | $M_2$ | $D_4$ | $D_{4H}$ | TRIFLIC | $NaHCO_3$ | $M_w$ | $M_n$ | $M_p$ | Pd |
|---|---|---|---|---|---|---|---|---|---|
| $M_2D_{19}D_6H$ | 37.97 g | 129.0 g | 33.03 g | 295 µL | 2.8 g | 1564 | 2845 | 2599 | 1.82 |
| $M_2D_{13}D_{13}H$ | 38.39 g | 89.24 g | 72.37 g | 295 µL | 2.8 g | 1562 | 28.03 | 2463 | 1.79 |

Example 5

Synthesis of methacrylate end-capped poly(6 mole % neohexyl-methylsiloxane)-co-(19 mole % dimethylsiloxane)

To a 250 mL round bottom flask equipped with a magnetic stirrer and water condenser was added $M_2D_{19}D_6H$ (15 g, 0.007 mole), 3,3'-dimethylbutene (7.1 g, 0.08 mole), platinum divinyltertamethyldisiloxane complex (42 µL), 100 mL of anhydrous dioxane and 50 mL of anhydrous tetrahydrofuran under a nitrogen blanket. The reaction mixture was heated at reflux for 6 hours and monitored by IR or $^1$H-NMR spectroscopy for loss of silicone hydride. The solution was placed on a rotary evaporator to remove tetrahydrofuran and dioxane. The resulting oil was diluted with methylene chloride/pentane 20/80 (300 ml) and stirred overnight with 10 grams of silica gel. Solvent was then removed by flash evaporation and the oil was placed stirring on a vacuum pump under a pressure of <1 mm Hg at 50-60° C. for 4 hours to remove low molecular weight cyclic siloxanes. Recovered 12 grams of the macromonomer: Mn=3209, Mw=5592 and Pd=1.74.

Example 6

Synthesis of methacrylate end-capped poly(25 mole % neohexyl-methylsiloxane)-co-(75 mole % dimethylsiloxane)

To a 500 mL round bottom flask equipped with a magnetic stirrer and water condenser was added $M_2D_{75}D_{25}H$ (30 g, 4×10$^{-3}$ mole), 3,3'-dimethylbutene (17.7 g, 0.21 mole), platinum divinyltetramethyldisiloxane complex (40 µL), 100 mL of anhydrous dioxane and 150 mL of anhydrous tetrahydrofuran under a nitrogen blanket. The reaction mixture was heated at reflux and monitored by IR or $^1$H-NMR spectroscopy for loss of silicone hydride. The solution was placed on a rotary evaporator to remove tetrahydrofuran and dioxane. The resulting oil was diluted with methylene chloride/pentane 20/80 (250 ml) and passed through a 10 g column of silica gel. Solvent was then removed by flash evaporation and the oil was placed stirring on a vacuum pump under a pressure of <1 mm Hg at 50-60° C. for 4 hours to remove low molecular weight cyclic siloxanes. Recovered 30 grams of the macromonomer: Mn=11712, Mw=27718 and Pd=2.37.

Example 7

Synthesis of 2-Allyloxy-1,3-hexafluoropropane (Scheme 3)

Reagents sodium hydroxide 50 percent by weight (28.5 g), allyl bromide (943.2 g, 0.350 mole), and tetrabutlyammonium bromide (4.0 g, 0.0124 mole) were combined in an acid washed pressure vessel. The mixture was cooled in an ice bath and hexafluoroisopropanol (60 g, 0.356 moles) was added and the vessel was quickly capped. The reaction vessel was then transferred to an oil bath at 60° C. and left stirring over night. The reaction mixture was cooled, water was added and the organic layer was removed. The organic layer was washed with water, dried over magnesium sulfate and filtered. The filtrate was vacuum distilled to give 59.3 grams of the desired product (boiling point 40° C. @ 100 mm Hg, 99% pure by gas chromatography).

Synthetic Scheme 3:

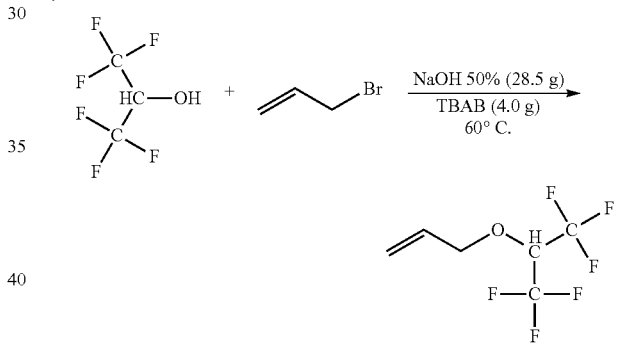

Example 8

General procedure for the synthesis of the fluoro side-chain siloxanes: synthesis of methacrylate end-capped poly(25 mole %(3-hexafluoroisopropoxy)propylmethylsiloxane)-co-(75 mole % dimethylsiloxane)(Scheme 4)

To a 500 mL round bottom flask equipped with a magnetic stirrer and water condenser was added $M_2D_{75}D_{25}H$ (20 g, 0.0027 mole), 2-allyloxy-1,3-hexafluoropropane (16.9 g, 0.081 mole), platinum divinyltertamethyldisiloxane complex (68 µL), 100 mL of anhydrous dioxane and 100 mL of anhydrous tetrahydrofuran under a nitrogen blanket. The reaction mixture was heated at reflux for 3 hours and monitored by IR or $^1$H-NMR spectroscopy for loss of silicone hydride. The reaction was complete in 4 to 5 hours of reflux. The resulting solution was placed on a rotary evaporator to remove tetrahydrofuran and dioxane. The resulting oil was diluted with methylene chloride/hexane 50/50 (300 ml) and stirred overnight with 15 grams of silica gel and a small amount of activated charcoal, then filtered. Solvent was removed by flash evaporation and the oil was placed stirring on a vacuum pump under a pressure of <1 mm Hg at 50-60° for 3 hours to remove low molecular weight cyclic siloxanes. Recovered 300 grams of the macromonomer: Mn=14207, Mw=50,178, Mp=34,331 and Pd=3.59

Examples 9-10

Synthesis of methacrylate end-capped poly(6 mole %(3-hexafluoroisopropoxy)propyl methyl siloxane)-co-(19 mole % dimethylsiloxane) ($M_2D_{19}D_{6\ hexafluoro}$) and methacrylate end-capped poly(13 mole % (3-hexafluoroisopropoxy)propylmethylsiloxane)-co-(13 mole % dimethylsiloxane) ($M_2D_{13}D_{13\ hexafluoro}$) (Scheme 4)

As described for the synthesis of $M_2D_{75}D_{25}$ hexafluoro in Example 6; ($M_2D_{19}D_{6\ hexafluoro}$) and ($M_2D_{13}D_{13\ hexafluoro}$) were prepared according to the table given below;

| Macromer | $M_2D_xD_{yH}$ | Amount (g) | Allyloxy-Hexafluoro-propane (g) | Pt (cat.) (µL) | Yield (g) | $M_w$ | $M_n$ | $M_p$ | Pd |
|---|---|---|---|---|---|---|---|---|---|
| $M_2D_{19}D_{6\ hexafluoro}$ | $M_2D_{19}D_{6H}$ | 50 | 35.1 | 140 | 70 | 20125 | 3426 | 5144 | 5.87 |
| $M_2D_{13}D_{13hexafluoro}$ | $M_2D_{13}D_{13H}$ | 20 | 30.1 | 121 | 35 | 25112 | 2555 | 5659 | 9.83 |

Example 11

Synthesis of Dichloromethyl-2-propyloxy-1,3-hexafluoroisopropylsilane

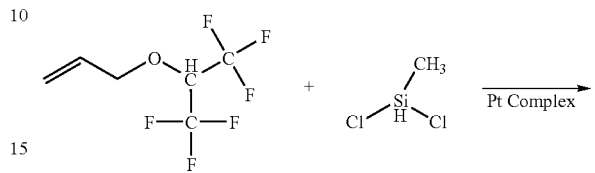

Synthetic Scheme 4

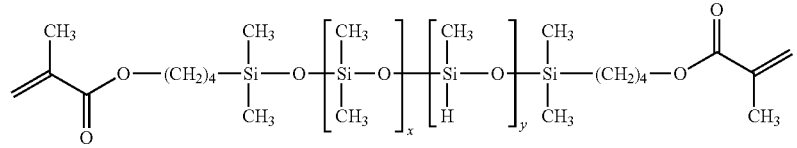

X = 75, 19, 13  Y = 25, 6, 13

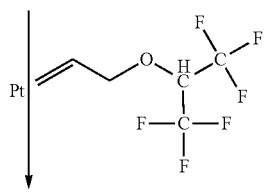

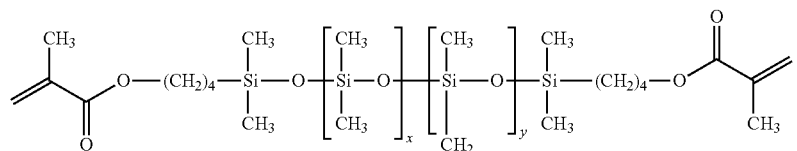

X = 75, 19, 13  Y = 25, 6, 13

-continued

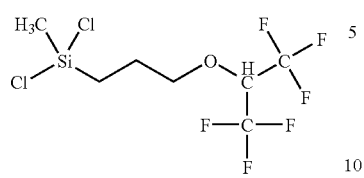

Procedure:

The reaction was carried out in an acid-washed pressure flask. The reaction vessel was cooled to −10° C. and reagents were added in the following order; Methyldichlorosilane (110 g, 0.960 mole), as purchased from Gelest, 2-allyloxy-1,3-hexafluoropropane (20 g, 0.096 mole) and platinum divinyltetramethyldisiloxane complex (100 μL), as purchased from Gelest. The vessel was sealed, stirred cold for 10 minutes, transferred to an 80° C. oil bath and left stirring overnight.

Excess dichloromethylsilane was distilled off at atmospheric pressure and the product distilled at 61° C. and a pressure of 3 mm of Hg to give 27 grams of product with a purity of 98% by gas chromatography.

Example 12

Synthesis of 1,3-hexafluoroisopropoxy-propyl (heptamethylcyclotetrasiloxane) ($D_{4\ hexafluoro}$)

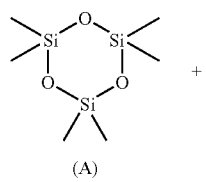

(A)

+

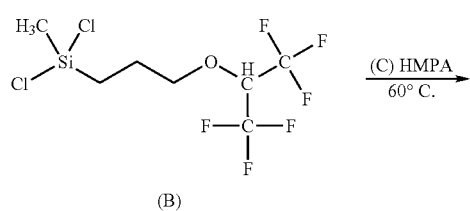

(B)

$\xrightarrow[60°\ C.]{(C)\ HMPA}$

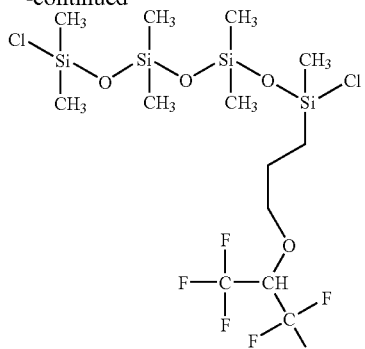

(D)

(E) H$_2$O
(F) Et$_2$O

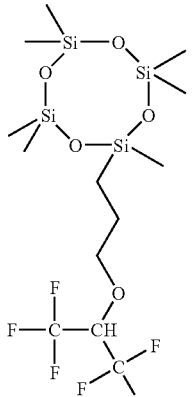

(G)

Procedure:

Reagents hexamethylcyclotrisiloxane (A, 33.4 g, 0.15 mole) and dichloromethyl-2-propyloxy-1,3-heafluoroisopropylsilane (B, 50 g, 0.15 mole) were combined in a dry acid washed 3 neck reaction flask fitted with a short condenser, magnetic stirrer, temperature controller, and nitrogen inlet. The mixture was heated under nitrogen to 60° C. melting reagent A. Reagent hexamethyl phosphoric triamide (C, 0.033 g, $1.84 \times 10^{-4}$ mole) was added and a 5° C. exotherm occurred. Heating was continued for 3-4 hours and the mixture left stirring under nitrogen at room temperature overnight.

The intermediate mixture was then added dropwise to a stirring mixture of E (50 mL) & F (150 mL). Upon completion of the addition, the mixture was allowed to stir for an additional 15 minutes then transferred to a separatory funnel. The water layer was extracted two times with ethyl ether. The combined organic layers were washed two times with water, two times with 5% sodium bicarbonate solution and again with water. The solution was then dried over magnesium sulfate; flash evaporated leaving the crude product. The product G was purified by vacuum distillation (boiling point 100° C. at 4 mm Hg) to give 48.6 grams with a purity of 98.6% by gas chromatography.

Example 13

Synthesis of methacrylate end-capped poly(6 mole % hexafluoroisopropoxy)propylmethylsiloxane-co-(19 mole % dimethylsiloxane)($M_2D_{19}D_6$ hexafluoro)

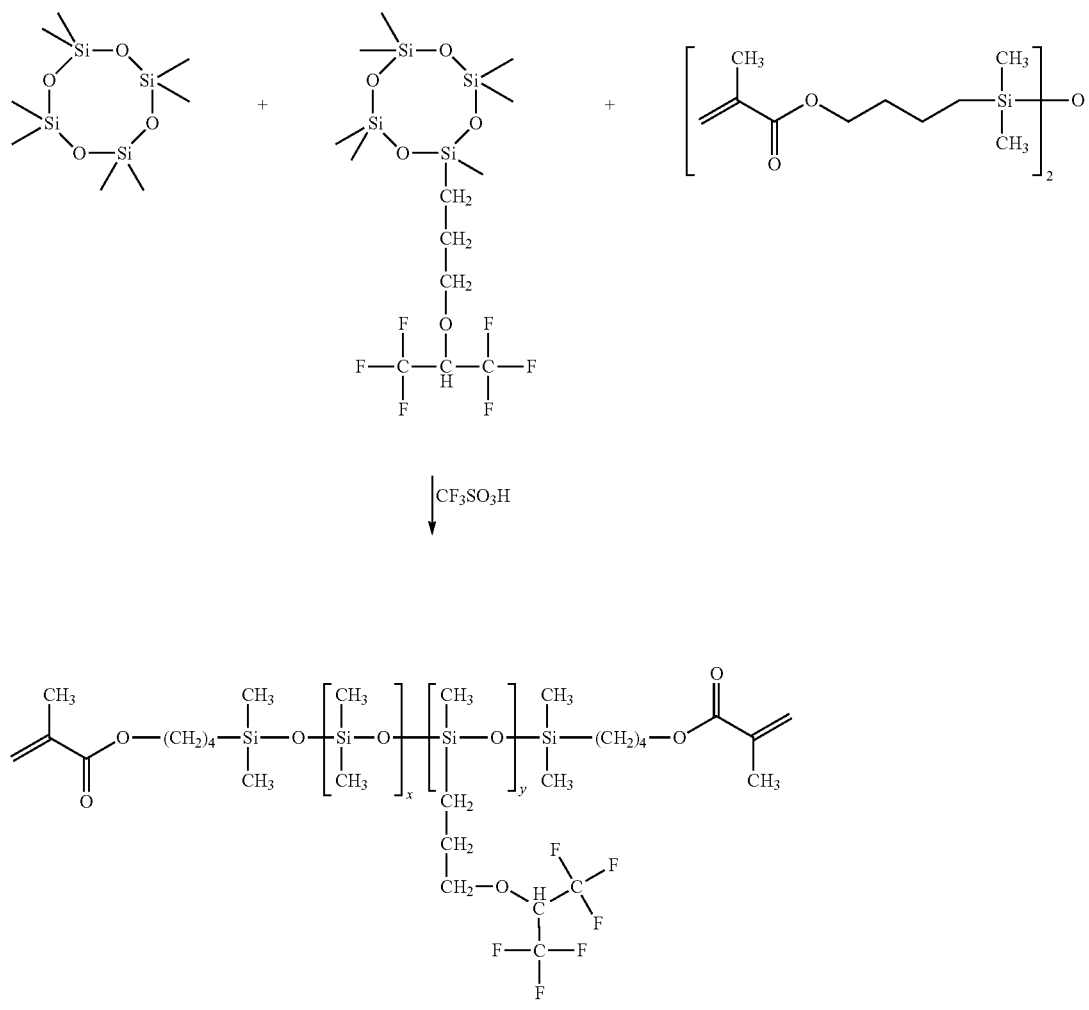

X = 19, Y = 6

To a 250 mL round bottom flask was added D4 (1.089 g, $3.7 \times 10^{-3}$ mole), 1,3-hexafluoroisopropoxypropyl(heptamethylcyclotetrasiloxane) (42.88 g, 0.087 mole) and $M_2$(6.04 g, 0.015 mole). Trifluoromethanesulfonic acid TRIFLIC (0.125 g, $8.3 \times 10^{--4}$ moles=74 μL) was added as initiator. The reaction mixture was stirred 24 hours room temperature. Excess sodium bicarbonate (0.7 g, $8 \times 10^{-3}$ mole) was then added and the reaction mixture was again stirred for 24 hours. The resultant solution was filtered through a 5μ Teflon® filter. The filtered solution was vacuum stripped (>0.1 mm Hg) at 50-60° C. to remove the silicone cyclics. The macromonomer $M_2D_{19}D_{6\,hexafluoro}$ (35 grams) was a viscous, clear fluid; SEC: Mn=2312, Mw=4640, Mp=5227 and Mw/Mn=2.01.

Example 14-18

Copolymers

Copolymers were made by combining the components listed in Tables 1 and 2 below, where each table lists parts by weight of the various components. In addition, each formulation included minor amounts of Vazo-52 thermal initiator, Vazo 64 thermal initiator, and D&C Green #6 dye. The formulations were added to cylindrical tubes, and rods were cast by thermal curing of the formulations contained in the tubes in a heated water bath at a temperature 40° C. for 3 days, following by placing the tubes in an oven at 65° C. for 2 days.

The following abbreviations are used in Tables 1 to 2:

NVP=N-vinyl-2-pyrrolidinone, NP=neopentyl glycol dimethacrylate, BHI=Bis(1,1,1,3,3,3-hexafluoroisopropyl) itaconate, TX91=3-methacryloyloxypropyl-tris(trimethylsiloxy)silane with 10% dimer, TX100=3-methacryloyloxypropyl-tris(trimethylsiloxy)silane, V2=Vazo-52 thermal initiator, V4=Vazo-64 thermal intiator, HFIPA=1,1,1,3,3,3-hexafluoroisopropyl methacrylate, L256=Lupersol peroxycarbonate thermal initiator.

TABLE I

Mechanical and physical properties for modified formulations based on a DP25 methacrylate-capped 25 mole % neohexyl side-chain siloxane.

| | Formulation | |
|---|---|---|
| | MTS012104-2 | MTS012104-3 |
| Methacrylic acid | 3 | 5 |
| NVP | 5 | 5 |
| NP | 7 | 7 |
| BHI | 44 | 20 |
| TX-91 | 30.8 | 35 |
| M2D(neohexyl) | 10.5 | 35 |
| V2 | 0.054 | 0.054 |
| V4 | 0.17 | 0.17 |
| Rockwell Hardness | 92 | 31 |
| Shore D Hardness | 77 | 63 |
| Dk (ISO/FATT) | 122 | 130 |

TABLE II

Mechanical and physical properties for modified formulations based on a DP25 methacrylate-capped 25 mole % 3-(hexafluoropropoxy)propyl side-chain siloxane.

| | Formulation | | |
|---|---|---|---|
| | JM1-08-18-04 | JM3-08-18-04 | JM3-06-07-04 |
| Methacrylic acid | 6 | 6 | 4.4 |
| NP | 7 | 7 | 4.8 |
| HFIPM | 40 | 52 | 0 |
| TX100 | 33 | 24 | 82 |
| M2D(hexafluoro) | 13 | 10.2 | 7.3 |
| L256 | 0.09 | 0.09 | 0.09 |
| Rockwell Hardness | 97 | 110 | 110 |
| Shore D Hardness | 75 | 80 | 62 |
| Dk (ISO/FATT) | 117 | 101 | 202 |

Oxygen permeability (also referred to as Dk) was determined by ISO/FATT or polarography method (ISO 9913) Other methods and/or instruments may be used as long as the oxygen permeability values obtained therefrom are equivalent to the described method. The oxygen permeability of silicon-containing contact lenses was measured by the polarographic method (ANSI Z80.20-1998) using an O2 Permeometer Model 201T instrument (Createch, Albany, Calif. USA) having a probe containing a central, circular gold cathode at its end and a silver anode insulated from the cathode. Measurements were taken only on pre-inspected pinhole-free, flat film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath containing circulating phosphate buffered saline (PBS) equilibrated at 35° C.±0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. In some cases, it may be useful to employ a Teflon polymer membrane, e.g., having a circular disk shape, between the probe cathode and the film sample. In such cases, the Teflon membrane is first placed on the pre-moistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, Optom Vis Sci 7 (12s): 95 (1997), the disclosure of which is incorporated herein in its entirety:

| Material Name | Repository Values | Lower Limit | Upper Limit |
|---|---|---|---|
| Fluoroperm 30 | 26.2 | 24 | 29 |
| Menicon EX | 62.4 | 56 | 66 |
| Quantum II | 92.9 | 85 | 101 |

Although various preferred embodiments have been described, it is understood that the invention is not limited thereto and modifications and variations would be evident to a person of ordinary skill in the art.

What is claimed is:

1. A contact lens that is the polymerization product of a monomeric mixture comprising a bulky side-chain siloxane cross linker.

2. The contact lens of claim 1, wherein the bulky side chain siloxane cross linker has the following structural formula:

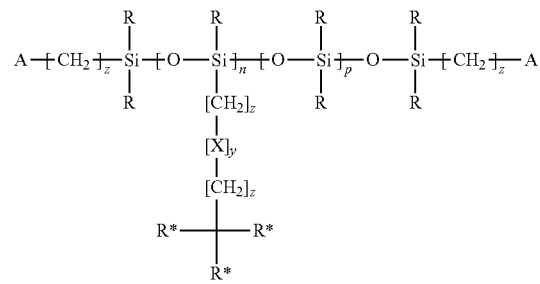

wherein z is 2-10, n, p and z are integers, X is oxygen, sulfur or —NH—, y is 0 or 1, R* is independently alkyl, arylalkyl, cycloalkyl, heterocyclo or fluoroalkyl, trialkyl or triarylsilyl, or trialkoxyl or triaryloxysilane radical, A is activated unsaturation such as acrylate, methacrylate, acrylamido, styryl, maleimideo, itacanoyl, vinyl, vinyl ether, vinyl carbonate, and R is independently alkyl, arylalkyl cycloalkyl, heterocyclo or fluoroalkyl radical.

* * * * *